United States Patent
Selle

(10) Patent No.: US 6,640,968 B2
(45) Date of Patent: Nov. 4, 2003

(54) RETAINER

(75) Inventor: Stephen Selle, Mentor, OH (US)

(73) Assignee: Stafast Products, Inc., Painesville, OH (US)

( * ) Notice: Subject to any disclaimer, the term of this patent is extended or adjusted under 35 U.S.C. 154(b) by 229 days.

(21) Appl. No.: 09/951,349

(22) Filed: Sep. 13, 2001

(65) Prior Publication Data

US 2003/0049097 A1 Mar. 13, 2003

(51) Int. Cl.[7] .............................................. B65D 85/02
(52) U.S. Cl. ...................... 206/303; 206/338; 206/445
(58) Field of Search ................................ 206/338, 445, 206/485, 486, 499, 303

(56) References Cited

U.S. PATENT DOCUMENTS 4,172,523 A * 10/1979 Weglage ..................... 206/338
5,114,014 A * 5/1992 Ascalon et al. ............... 206/84

* cited by examiner

*Primary Examiner*—Jacob K. Ackun
(74) *Attorney, Agent, or Firm*—Woodling, Krost and Rust

(57) ABSTRACT

A stud retainer comprising a generally disk shaped body having a periphery, an aperture therethrough and a wing portion extending from said periphery is disclosed and claimed. The disk shaped body includes a crown and the crown is concentric with the aperture. The wing portion extends laterally and transversely from an arcuate portion of the periphery of the disk shaped body. The aperture has an inner diametrical surface and an outer diametrical surface. The inner and outer diametrical surfaces of the aperture are smooth. A delivery track for guiding the stud retainers is disclosed and claimed. The process for making the stud retainer is also disclosed and claimed. The process includes the steps of: punching a hole in the spring steel from a first side of the sheet of spring steel creating a smooth surface on the inlet side of said hole, coining the hole from the other side of the steel creating a smooth service on the outlet side of the hole, embossing the hole from the other side of the steel; and, cutting off the stud retainer from said sheet of spring steel.

2 Claims, 8 Drawing Sheets

RETAINER

FIELD OF THE INVENTION

The invention is in the field of washers (sometimes referred to herein as retainers or fasteners) for affixing a stud to a substrate.

BACKGROUND OF THE INVENTION

Some of the problems associated with fasteners which affix studs to substrates have been addressed in U.S. Pat. Nos. 4,834,603 and 4,385,431 whose disclosures are hereby incorporated herein by reference. These patents address problems associated with cracking which occur when washers (retainers) are manufactured by punching a hole through a relatively thin sheet of springy, hardened steel or stainless steel from a first side followed by forming a crown (dome) in the steel from the other (second) side. The exit portion of the punched-out hole contains burrs and irregularities which grip a protruding stud. It is these burrs and irregularities which cause cracking in the steel material and the aforementioned patents sought to prevent such cracking by forming a crown (dome) in the steel from the same side, i.e., the first side of the assembly. In this way the aforementioned patents enabled the production of small overall outside diameter retainers (washers) so that they could be used in miniature devices.

The washers of the instant invention are directed toward fixing a stud to a substrate wherein the substrate is typically manufactured of wood. A problem associated with washers used in affixing studs to wood substrate, for example, has to do with the delivery of the washer by automatic feeding equipment. Washers of the prior art have the disadvantage of delivery problems caused by the washers riding up upon themselves in a delivery system. When the washers ride up onto themselves they tend to shingle causing delivery line blockage and stoppage.

Therefore, it is highly desirable to have a delivery track in combination with stud retainers which can be quickly delivered and applied to the end use. The instant invention will be best understood when reference is made to the Summary Of the Invention, Brief Description Of The Drawings, Description Of The Invention and Claims which follow hereinbelow.

SUMMARY OF THE INVENTION

It is an object of the present invention to provide a stud retainer which can be delivered by a delivery track without undue stoppage of the delivery system due to jamming or shingling of the stud retainer.

It is a further object of the present invention to provide a delivery track which guides a stud retainer.

It is a further object of the present invention to provide a stud retainer which includes at least one wing portion for guiding it through a delivery track.

It is a further object of the present invention to provide a stud retainer which will not shingle over another stud retainer.

It is a further object of the present invention to provide a stud retainer having minimal dimensions especially those having a minimal diametrical dimension so as to enable use of the retainer in small environments.

It is an object of the present invention to provide a reverse formed stud retainer having smooth gripping edges.

It is a further object of the present invention to provide a stud retainer made by the method of punching a hole in the spring steel from a first side of said sheet of spring steel creating a smooth surface on the inlet side of said hole, coining said hole from the other side of said steel creating a smooth service on the outlet side of said hole; embossing said hole from said other side of said steel, and, cutting off said stud retainer from said sheet of spring steel.

A stud retainer comprising a generally disk shaped body having a periphery, an aperture therethrough and a wing portion extending from the periphery is disclosed and claimed. The aperture includes an inner diametrical surface and an outer diametrical surface. The inner and outer diametrical surfaces of the aperture are smooth. The disk shaped body includes a crown and the crown is concentric with the aperture. The wing portion extends laterally and transversely from the periphery of the disk shaped body. The wing portion extends arcuately along the periphery of the disk shaped body.

A process for making stud retainers from a sheet of spring steel utilizing a punch, a coin punch, and an embossing punch comprising the steps of: punching a hole in the spring steel from a first side of the sheet of spring steel creating a smooth surface on the inlet side of said hole; coining the hole from the other side of the steel creating a smooth service on the outlet side of the hole; embossing the hole from the other side of the steel; cutting off the stud retainer from the sheet of spring steel and forming undeformed lips; and, compressing the undeformed lips to form the lips which are sometimes referred to herein as the wing portions.

Additional objects of the invention will best be understood when reference is made to the Brief Description Of The Drawings, Description Of The Invention and Claims which follow hereinbelow.

A better understanding of the invention will be had when reference is made to the Description Of The Invention and Claims which follow hereinbelow.

DESCRIPTION OF THE INVENTION

Figure 1:
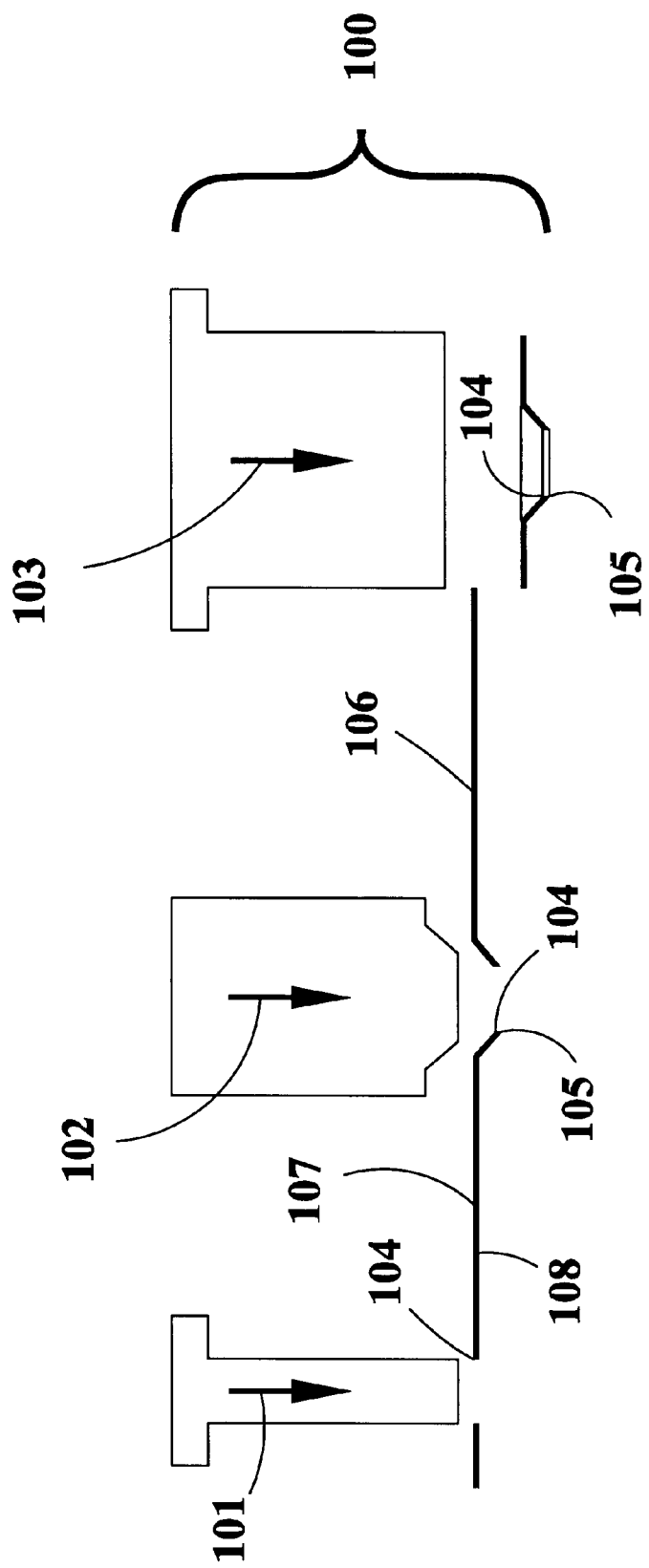
FIG. 1 is a diagrammatic illustration of the prior art process as described in U.S. Pat. Nos. 4,385,431 and 4,834,603.

FIG. 1 is a diagrammatic illustration of the prior art process 100 as described in U.S. Pat. Nos. 4,385,431 and 4,834,603. These patents disclose the desirability of punching and forming a dome from the same side of the sheet metal. Reference numeral 101 represents diagrammatically a punch entering and piercing the metal 106 from a first side 107. The metal 106 is preferably sheet metal.

In forming the hole or aperture in the metal 106 the entrance end 104 is smooth and the exit end 105 in the second side 108 of the metal 106 is sharp and jagged. Next, a dome forming device 102 is used to create a dome or crown from the same side 107 as the hole was punched. Finally, a cylindrical cutting tool 103 cuts off the stud retainer 109. The main motivation for the prior art process just described was the minimization of the diameter of the body of the stud retainer so as to enable miniaturization of the retainer and use on small devices. According to U.S. Pat. No. 4,834,603 the use of burred edges and/or slitted edges prevented attempts to minimize the outer dimensions of the prior art fasteners as the burred and/or slitted edge contained many cracks, discontinuations and/or irregularities therein which resulted in cracking and/or other failure of the fastener body unless at least a predetermined minimal outer dimension thereof was provided.

Figure 2A:
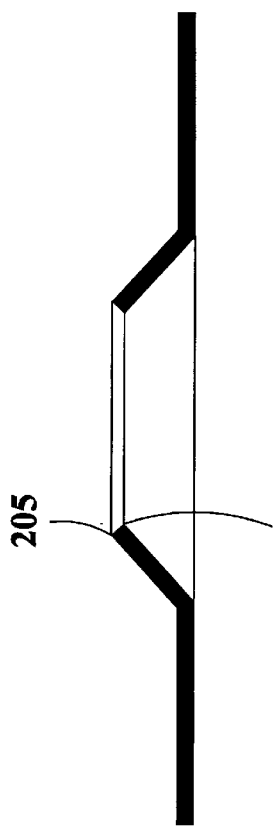
FIG. 2A is an enlargement of a portion of FIG. 2.
Figure 2:
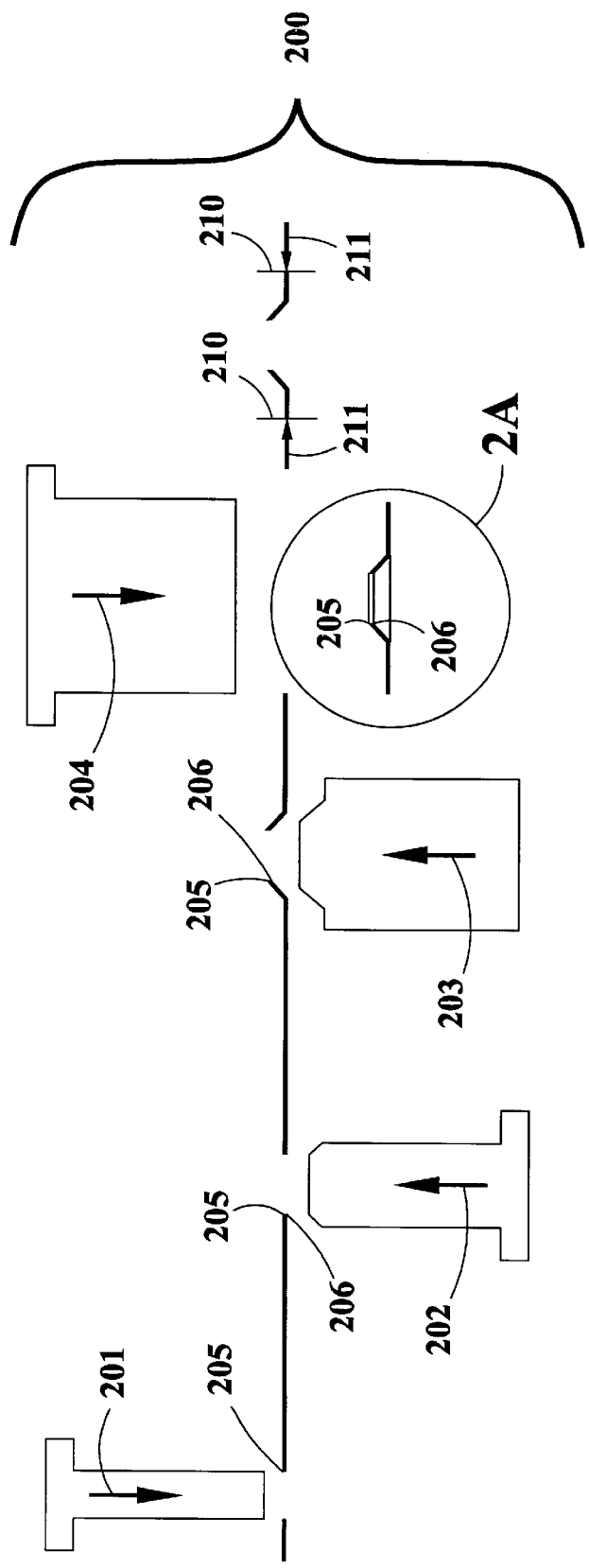
FIG. 2 is a diagrammatic illustration of the process of the instant invention.
Figure 2B:
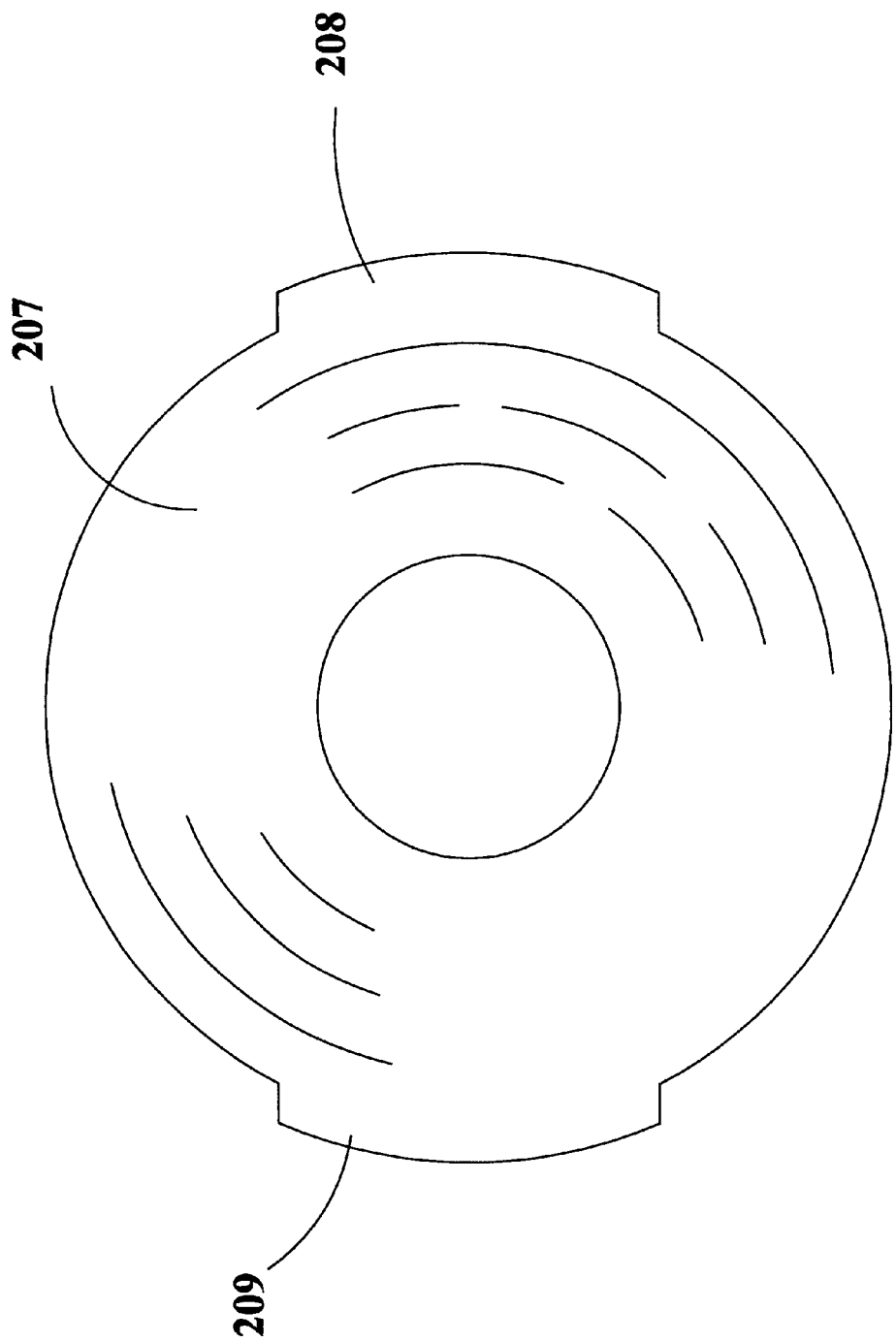
FIG. 2B is an enlargement of a top view of the cut out illustrating the undeformed lips (undeformed wing portions).

FIG. 2 is a diagrammatic illustration of the process 200 of the instant invention. Punch tool 201 punches and pierces the sheet metal 106 from the first side 107 thereof. Coining tool 202 smooths the jagged edges which exist at point 206 prior to the actual coining of the surface. After the coining tool is used on the second side of the metal 108 both edges 205 and 206 are smooth. Next, embossing tool 203 is applied to the second side 108 of the sheet metal. Cutoff tool 204 is used to cut off the stud retainer 207 from the first side in the shape illustrated in FIG. 2B. FIG. 2B illustrates undeformed lips 208, 209 or wings. Once cutoff the stud retainer 207 is compressed such that the undeformed lips 208, 209 are compressed and protrude in the transverse or upward direction. See, FIGS. 3 and 4.

The preferred sheet metal material for the instant invention is 1050 carbon spring steel having a Rockwell hardness in the range of 45–50. These are not hard and fast material requirements and other materials may be used without departing from the spirit and scope of the claimed invention.

FIG. 2A is simply an enlargement of a portion of FIG. 2 and it is itself a schematic representation of the stud retainer 207. Stud retainer 207, however, as is shown in FIG. 2B is an actual top view prior to the deformation of the wings 208, 209. FIG. 2B is an enlargement of a top view of the cut out illustrating the undeformed lips 208, 209 (undeformed wing portions).

Figure 3:
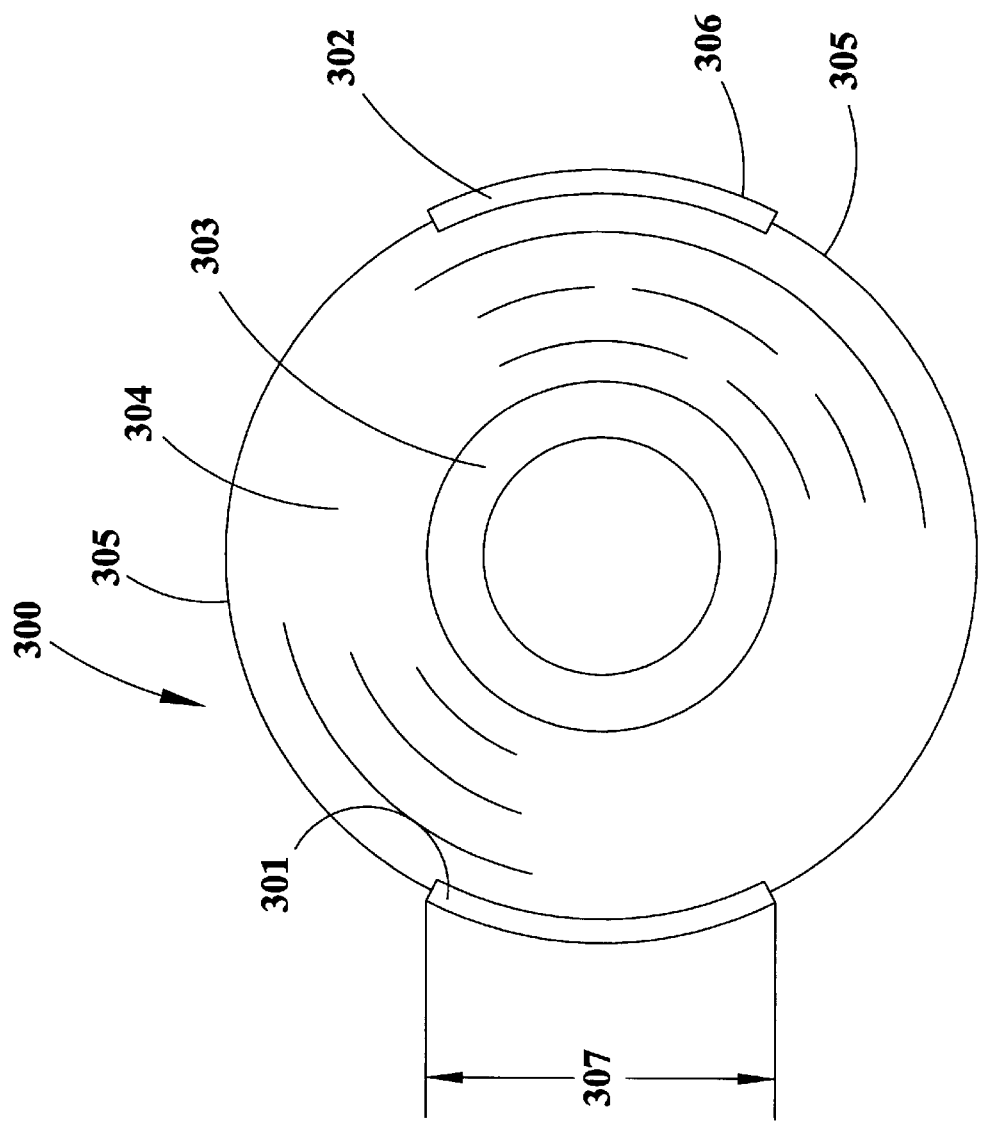
FIG. 3 is a top view of the cut out illustrating the deformed lips (deformed wing portions).
Figure 4:
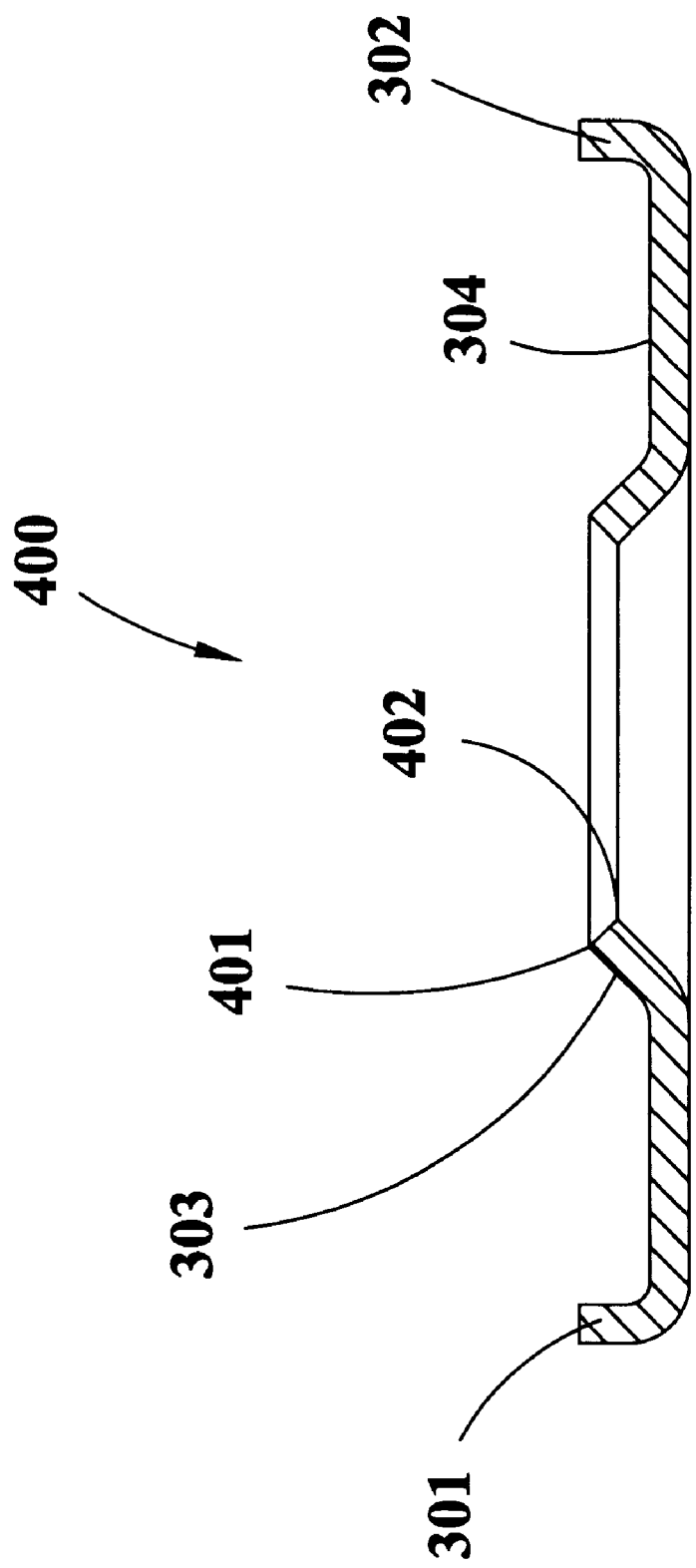
FIG. 4 is a cross-sectional view taken along the lines 4—4 of FIG. 3 illustrating the deformed lips, and the aperture having smooth inner and outer diametrical surfaces.

FIG. 3 is a top view 300 of the stud retainer 207 illustrating the deformed lips 301, 302 (deformed wing portions). Crown 303 in the body 304 is formed by the embossing tool 203 is illustrated in FIGS. 3 and 4. FIG. 4 is a cross-sectional view taken along the lines 4—4 of FIG. 3 illustrating the deformed lips 301, 302 , and the aperture having smooth inner 402 and outer 401 diametrical surfaces. Referring to FIG. 3 it will be observed that the deformed lips 301, 302 arcuately extend around the periphery 305 of the stud retainer. Careful observation of FIGS. 3 and 5 indicates that the deformed lips 301, 302 extend radially outwardly beyond the periphery of the stud retainer 300.

Stud retainer 300 is generally circularly shaped. Thickness of the retainer is approximately 0.024 inches and the radius of curvature of the deformed lips is approximately 0.039 inches. The diameter of the stud retainer is 0.75 inches and the diameter of the aperture is 0.235 inches. The diameter of the deformed lips is 0.774 inches. The height of the deformed lip is 0.069 inches and the height of the crown is 0.060 inches. The deformed lips are in the form of an arc and have a width 307 of approximately 0.350 inches for a washer having 0.75 inches diameter.

Figure 5:
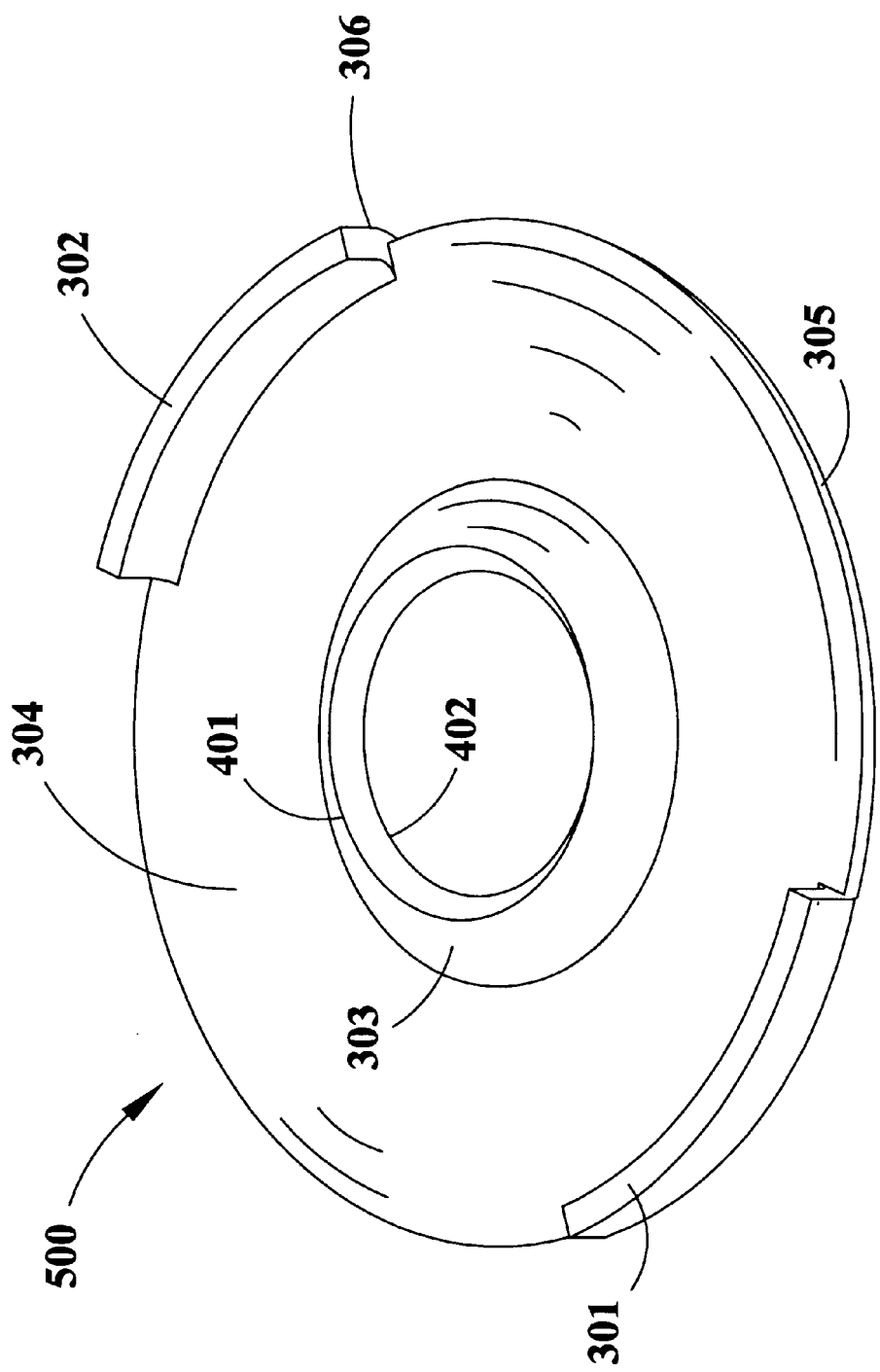
FIG. 5 is a perspective view of the stud retainer.
Figure 6:
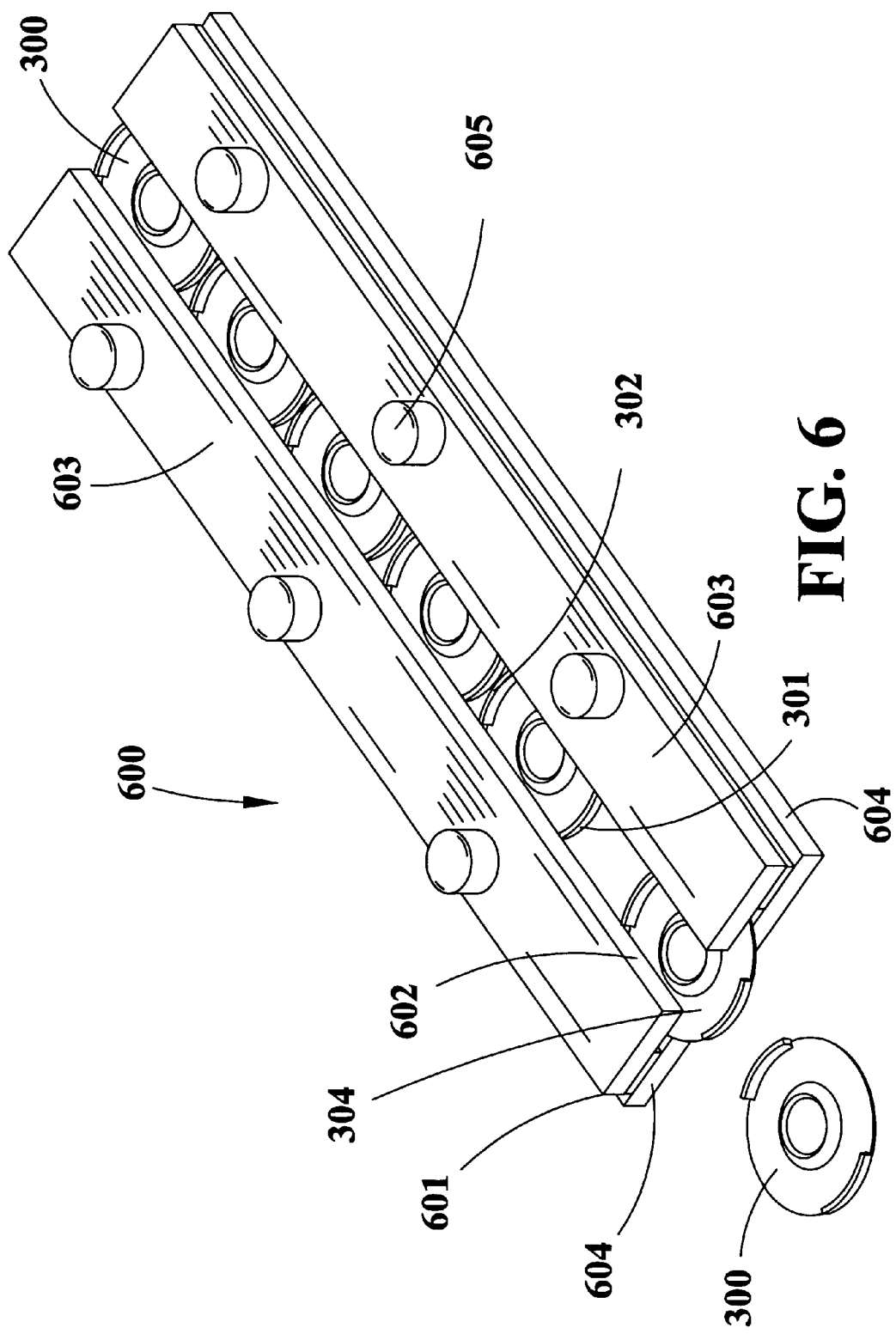
FIG. 6 is a perspective view of the delivery track together with the stud retainers illustrating the guidance of the retaining studs along the delivery track.

FIG. 5 is a perspective view 500 of the stud retainer illustrating the lips 301, 302, crown 303 and periphery 305 thereof. FIG. 6 is a perspective view of the delivery track 600 together with the stud retainers 300 illustrating the guidance 602 of the retaining studs 300 along the delivery track 603, 604. Upper portions 603 of the track and lower portions 604 of the track are spaced apart by a shim 601 or other spacer. Inner surfaces 602 of the upper portions 603 guide wings 301, 302 of the stud retainers 300 as they move along the track. The body portion 304 of the stud retainer 300 is able to slide between the lower portions 604 of the track and the upper portions 603 of the track as adequate clearance is provided by spacer 601. The stud retainers 300 are propelled through the channel formed by the upper portions and lower portions of the delivery track with the deformed lips being guided through the space between the inner surfaces 602 of the delivery track 600 upon a motive force being applied to one of the stud retainers 300. The stud retainers are pushed through the delivery track. Each of the lips of the stud retainers engages a lip of the adjacent retainer and does not ride up upon it. The height of the lips 301, 302 is 0.069 inches and shingling of the washers is prevented because the body portion 304 collides with the upper portion 603 of the delivery track. Keep in mind that some space or clearance must exist between the upper and lower portions of the track so as to allow these thin (approx. 0.024 inches thick at flat body portion 304) washers to pass therebetween. However, this space is minimized which in combination with the lips 301, 302 of the stud retainers 300 prevents shingling of the retainers as they push against each other in the delivery track.

Figure 7:
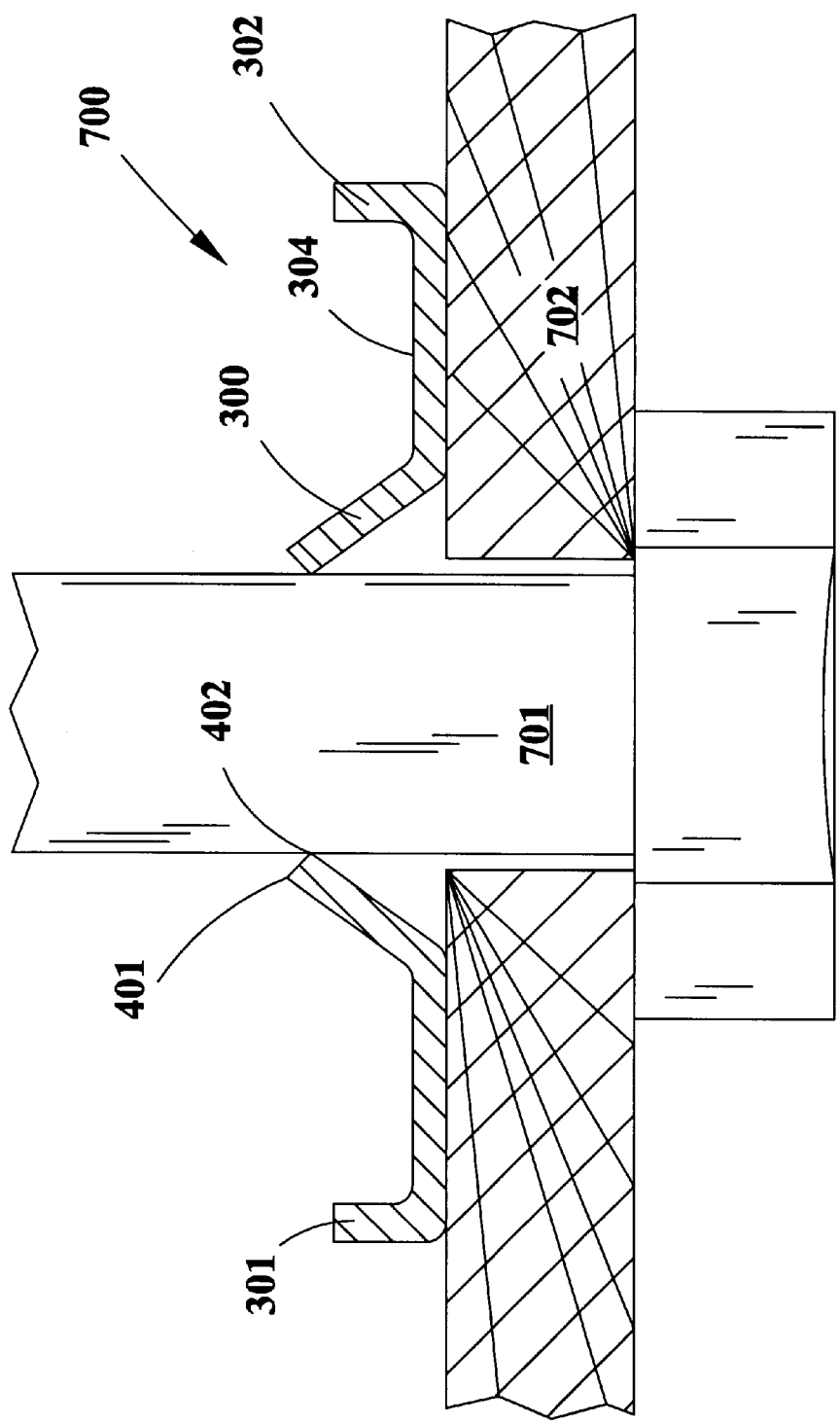
FIG. 7 is a cross-sectional view of the retaining stud anchoring a stud with respect to a substrate.

FIG. 7 is a cross-sectional view 700 of the stud retainer 300 anchoring a stud 701 with respect to a substrate 702. Smooth surface 402 frictionally engages stud 701 thereby securing it to the substrate 702. The substrate can be metal or wood.

Those skilled in the art will readily recognize that many changes may be made to the invention as disclosed herein without departing from the spirit and scope of the appended claims. The invention has been disclosed herein by example and many changes may be made to the structure, for instance, the shape of the wing portions may be changed, without departing from the spirit and scope of the following claims.

I claim:

1. A plurality of stud retainers and a delivery track, in combination, said stud retainer dispensed by said delivery track, wherein:

each of said stud retainers comprises: a generally disk shaped body having a periphery, an aperture therethrough and a wing portion extending from said periphery; said disk shaped body includes a crown and said crown is concentric with said aperture; said wing portion extends laterally and transversely from an arcuate portion of said periphery of said disk shaped body; said aperture having an inner diametrical surface and an outer diametrical surface; said inner and outer diametrical surfaces of said aperture being smooth;

said delivery track comprises: an upper portion and a lower portion, said upper and lower portions of said track being affixed together; said upper portion of said track being spaced apart from said lower portion of said track; said upper portion of said track includes an opening for guiding said wing portion of each of said stud retainers; and, said disk shaped body of each of said stud retainers being guided between said upper and lower portions of said track.

2. A plurality of stud retainers and a delivery track, in combination, as claimed in claim 1 wherein each of said stud retainers includes a first and second wing portion, said first and second wing portion of a stud retainer engages one of said first and second wing portions of another stud retainer when said stud retainers are guided within said delivery track.

* * * * *